(12) United States Patent
McDade et al.

(10) Patent No.: US 11,040,800 B2
(45) Date of Patent: Jun. 22, 2021

(54) COLLAPSIBLE DUNNAGE BOX

(71) Applicant: Schaefer Systems International, Inc., Charlotte, NC (US)

(72) Inventors: Clinton Lawrence McDade, Fort Mill, SC (US); Edward James Drummond, Clover, SC (US); Mark Edward Ward, Waxhaw, NC (US)

(*) Notice: Subject to any disclaimer, the term of this patent is extended or adjusted under 35 U.S.C. 154(b) by 0 days.

(21) Appl. No.: 16/519,689

(22) Filed: Jul. 23, 2019

(65) Prior Publication Data

US 2020/0324935 A1 Oct. 15, 2020

Related U.S. Application Data

(60) Provisional application No. 62/833,089, filed on Apr. 12, 2019.

(51) Int. Cl.
*B65D 21/08* (2006.01)
*B65D 25/16* (2006.01)

(52) U.S. Cl.
CPC ........... *B65D 21/086* (2013.01); *B65D 25/16* (2013.01)

(58) Field of Classification Search
CPC .. B65D 21/086; B65D 25/16; B65D 11/1873; B65D 21/068; B65D 88/522; B65D 11/18
See application file for complete search history.

(56) References Cited

U.S. PATENT DOCUMENTS

| | | | |
|---|---|---|---|
| 4,913,302 A | 4/1990 | Stonier | |
| 7,246,705 B2 | 7/2007 | Kaltz, Jr. et al. | |
| 7,556,165 B2 | 7/2009 | McDade | |
| 2006/0237456 A1* | 10/2006 | McDade | B65D 11/1826 220/6 |
| 2006/0249416 A1* | 11/2006 | Bradford | B65D 19/44 206/485 |
| 2007/0241104 A1* | 10/2007 | Huizingh | B65D 21/086 220/8 |
| 2010/0025398 A1* | 2/2010 | Krohn | B65D 88/12 220/7 |
| 2013/0238526 A1 | 9/2013 | Co et al. | |

FOREIGN PATENT DOCUMENTS

JP 4921940 B2 4/2012

OTHER PUBLICATIONS

International Search Report for related International Application No. PCT/US2020/027482, dated Jun. 29, 2020, 2 pages. [New art cited herein.].
Written Opinion of the International Searching Authority for related International Application No. PCT/US2020/027482 dated Jun. 29, 2020, 7 pages.

* cited by examiner

*Primary Examiner* — Shawn M Braden
(74) *Attorney, Agent, or Firm* — Shumaker, Loop & Kendrick, LLP

(57) ABSTRACT

A collapsible dunnage box is provided that includes a box base and first and second opposed base sidewalls attached to the box base on opposing sides of the box. First and second opposed top sidewalls are pivotally attached to the top edge of respective ones of the base sidewalls. First and second opposed top endwalls are provided to form a box enclosure. The base endwalls are pivotally-mounted to the top endwalls and are moveable between a lowered, vertical deployed position enclosing respective ends of the box and a raised, horizontal stowed position to contain and store dunnage positioned in an upper portion of the box.

17 Claims, 19 Drawing Sheets

COLLAPSIBLE DUNNAGE BOX

PRIORITY CLAIM

This application claims priority from and incorporates by reference U.S. Provisional Patent Application Ser. No. 62/833,089, filed Apr. 12, 2019.

TECHNICAL FIELD AND BACKGROUND OF THE INVENTION

This invention relates to a collapsible dunnage box of the general type frequently used to transport parts to, for example, assembly lines or to other commercial and industrial locations, where the box is progressively emptied of its contents. This invention also discloses a collapsible box that includes a dunnage set that can be collapsed along with the box. The ability of the box to be collapsed permits a large number of empty boxes to be returned to a remote location for cleaning and/or refilling in a much smaller volume of space than if the boxes remained in the erect condition. In many instances these boxes contain "dunnage." Dunnage is generally defined as packing material such as boards, blocks, planks, metal or plastic bracing or other internal structures used in supporting and securing objects positioned in the box during shipment and storage. The increasing use of "just in time" parts deliveries has also increased the use of collapsible boxes with many varied types of internal dunnage structures which not only protect the objects while in the box but position the objects in a predetermined orientation for ease of removal. This type of dunnage may include fabric or other sheet material constructed as pockets that are suspended in the box that cradle and separate the objects from each other. Since this dunnage is also reusable along with the box itself, it is most efficient and cost-effective to be able to ship the box and the dunnage together back to its place of origin.

Prior art collapsible boxes include boxes with the dunnage storage in the bottom of the box. Instead of a normal shallow bottom box component, the collapsing walls of the box are attached to a box component as the bottom. Normally, the collapsible box collapses down to a predetermined height. All of the volume is filled with the folded and pivoting sidewalls. There is no empty volume. The open usable volume that the dunnage bottom provides is a lower volume that remains empty when the sidewalls are folded down. Removable dunnage can be removed from the erect box, folded up and placed in this bottom cavity, keeping the dunnage with the collapsed box.

SUMMARY OF THE INVENTION

In one aspect of the invention, a collapsible dunnage box is provided that includes a box base and first and second opposed base sidewalls attached to the box base on opposing sides of the box. First and second opposed top sidewalls are pivotally attached to the top edge of respective ones of the base sidewalls. First and second opposed top endwalls are provided to form a box enclosure. The base endwalls are pivotally-mounted to the top endwalls and are moveable between a lowered, vertical deployed position enclosing respective ends of the box and a raised, horizontal stowed position to contain and support dunnage positioned in an upper portion of the box.

In accordance with another aspect of the invention, a collapsible dunnage box is provided that includes a box base and first and second opposed base sidewalls attached to the box base on opposing sides of the box. Each of the first and second base sidewalls includes a lower base sidewall panel attached by a base hinge to the box base and an upper base sidewall panel attached to a top edge of respective ones of the lower base sidewall panels along adjacent edges by respective sidewall hinges. The upper and lower base sidewall panels are pivotally-moveable relative to each other and the base between an erect vertical deployed position and an inwardly collapsed horizontal stowed position. First and second opposed top sidewalls are pivotally attached to the top edge of respective ones of the upper base sidewall panels by respective sidewall hinges. First and second opposed top endwalls perpendicular to and connecting the first and second top sidewalls are provided to form a box enclosure. The top endwalls and the top sidewalls collectively define a collar extending around a periphery of the box. First and second opposed base endwalls are pivotally-mounted to the top endwalls of the collar perpendicular to the first and second sidewalls and are moveable between a lowered, vertical deployed position enclosing respective ends of the box and a raised, horizontal stowed position. The stowed position is adapted to contain and store dunnage positioned in an upper portion of the box defined by the collar.

In accordance with another aspect of the invention, the dunnage box is collapsed from its deployed position to its stowed position by first pivoting the first and second opposing base endwalls upwardly and inwardly from the vertical deployed position into the horizontal stowed position, and thereafter pivoting the first and second opposing base sidewalls inwardly towards each other to allow the collar to descend towards the box base.

In accordance with another aspect of the invention, the dunnage box is collapsed from its deployed position to its stowed position by pivoting the first and second opposing base endwalls upwardly and inwardly from the vertical deployed position into the horizontal stowed position, and pivoting the first and second opposing base sidewalls inwardly towards each other to allow the collar to descend towards the box base.

In accordance with another aspect of the invention, the top endwalls include dunnage hangers for suspending a plurality of dunnage pockets within the box.

In accordance with another aspect of the invention, the collapsible dunnage box according to claim 1, in combination with a plurality of dunnage pockets formed of a crushable, reusable web material adapted for being compressed into a size and shape suitable for being contained within the collar of the dunnage box when in its stowed position.

In accordance with another aspect of the invention, the base includes a flat box bottom defining the perimeter of the box and a raised rim extending around the perimeter of the box bottom.

In accordance with another aspect of the invention, the top endwalls include recessed hand holds for lifting the box.

In accordance with another aspect of the invention, a collapsible dunnage box is provided that includes a box base and first and second opposed base sidewalls attached to the box base on opposing sides of the box. Each of the first and second base sidewalls include a lower base sidewall panel attached by a base hinge to the box base and an upper base sidewall panel attached to a top edge of respective ones of the lower base sidewall panels along adjacent edges by respective sidewall hinges. The upper and lower base sidewall panels are pivotally moveable relative to each other and the base between an erect vertical deployed position and an inwardly collapsed horizontal stowed position. First and second opposed top sidewalls pivotally attached to the top edge of respective ones of the upper base sidewall panels by respective sidewall hinges. First and second opposed top endwalls perpendicular to and connecting the first and second top sidewalls are provided to form a box enclosure. First and second opposed base endwalls are pivotally-mounted to the top endwalls and moveable between a lowered, vertical deployed position enclosing respective ends of the box and a raised, horizontal stowed position to contain and store dunnage positioned in an upper portion of the box.

In accordance with another aspect of the invention, the dunnage box is collapsed from its deployed position to its stowed position by first pivoting the first and second opposing base endwalls upwardly and inwardly from the vertical deployed position into the horizontal stowed position and thereafter pivoting the first and second opposing base sidewalls inwardly towards each other.

In accordance with another aspect of the invention, the dunnage box is collapsed from its deployed position to its stowed position by pivoting the first and second opposing base endwalls upwardly and inwardly from the vertical deployed position into the horizontal stowed position and pivoting the first and second opposing base sidewalls inwardly towards each other.

In accordance with another aspect of the invention, the top endwalls include dunnage hangers for suspending a plurality of dunnage pockets within the box.

In accordance with another aspect of the invention, a method of storing dunnage within a dunnage box is provided and includes providing a collapsible dunnage box that includes a box base and first and second opposed base sidewalls attached to the box base on opposing sides of the box. Each of the first and second base sidewalls include a lower base sidewall panel attached by a base hinge to the box base and an upper base sidewall panel attached to a top edge of respective ones of the lower base sidewall panels along adjacent edges by respective sidewall hinges. First and second opposed top sidewalls are pivotally attached to the top edge of respective ones of the upper base sidewall panels by respective sidewall hinges. First and second opposed top endwalls perpendicular to and connecting the first and second top sidewalls are provided to form a box enclosure. First and second opposed base endwalls are pivotally-mounted to the top endwalls and moveable between a lowered, vertical deployed position enclosing respective ends of the box and a raised, horizontal stowed position. The stowed position is adapted to contain and store dunnage positioned in an upper portion of the box. The upper and lower base sidewall panels are moved relative to each other and the base between an erect vertical deployed position and an inwardly collapsed horizontal stowed position, and the first and second opposed base endwalls are moved between a lowered, vertical deployed position enclosing respective ends of the box and a raised, horizontal stowed position, the stowed position adapted to contain and store dunnage positioned in an upper portion of the box.

In accordance with another aspect of the invention, the method includes the steps of providing a plurality of dunnage pockets formed of a crushable, reusable web material positioned in the dunnage box, and compressing the dunnage into a size and shape suitable for being contained within the dunnage box when in its stowed position as the upper and lower base sidewall panels and the first and second opposed base endwalls are moved from the deployed position to the stowed position.

In accordance with another aspect of the invention, the method includes the step of moving the upper and lower base sidewall panels relative to each other and the base between an erect vertical deployed position and an inwardly collapsed horizontal stowed position is carried out first and thereafter the step of moving the first and second opposed base endwalls between a lowered, vertical deployed position enclosing respective ends of the box and a raised, horizontal stowed position is carried out.

DETAILED DESCRIPTION OF THE PREFERRED EMBODIMENT AND BEST MODE

Prior Art

Figure 1:
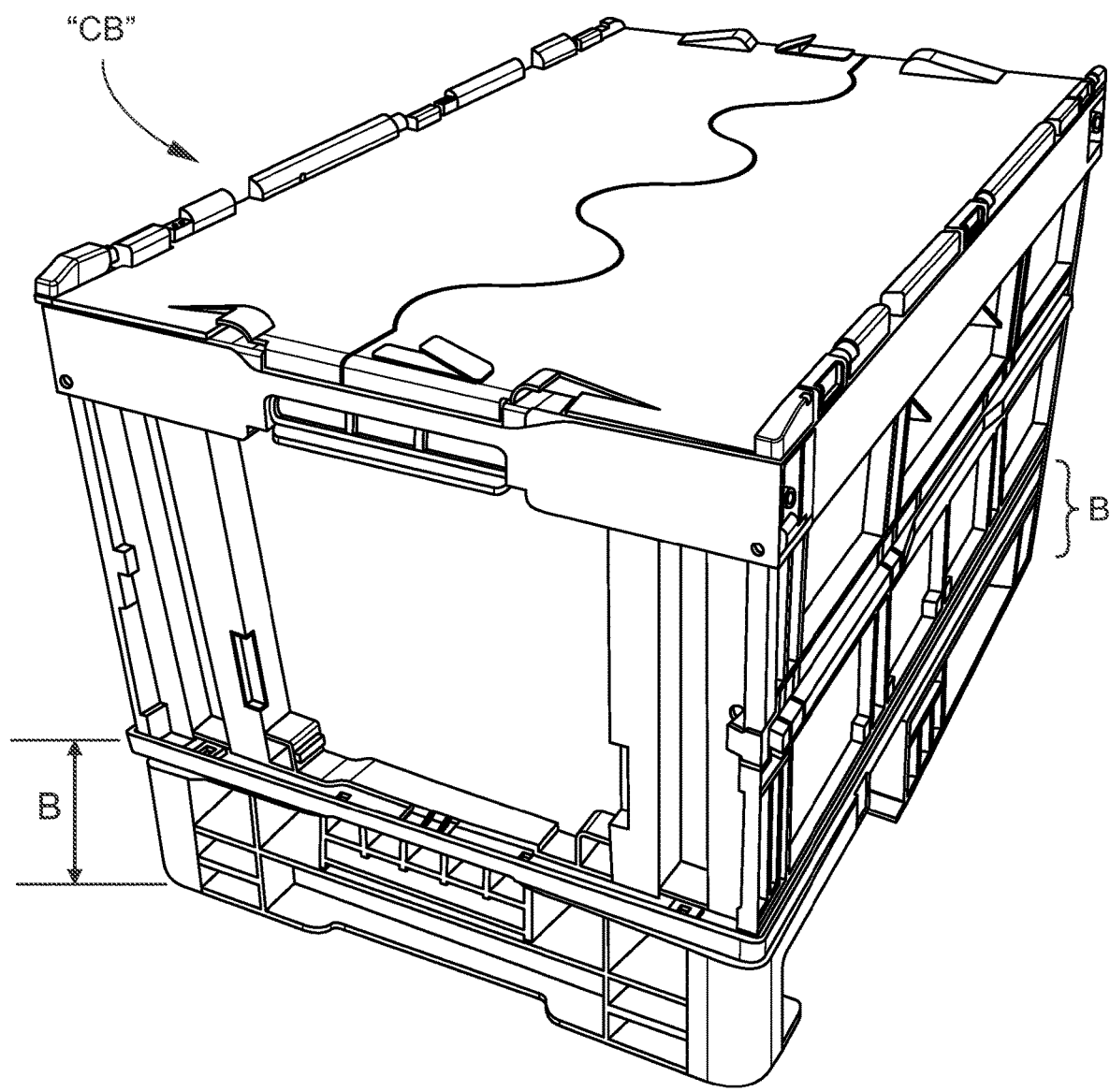
FIGS. 1-6, inclusive, are views of a prior art collapsible box.
Figure 2:
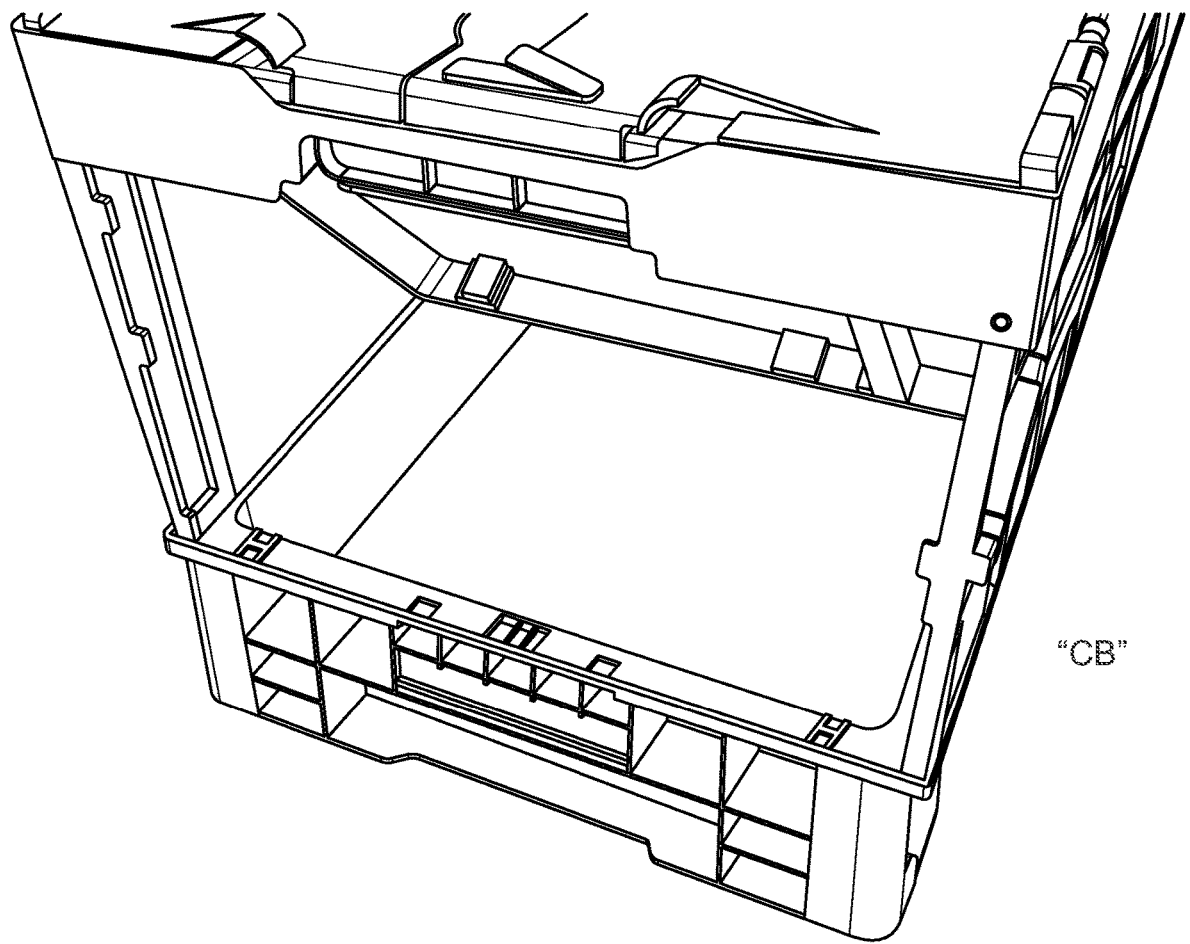
Figure 3:
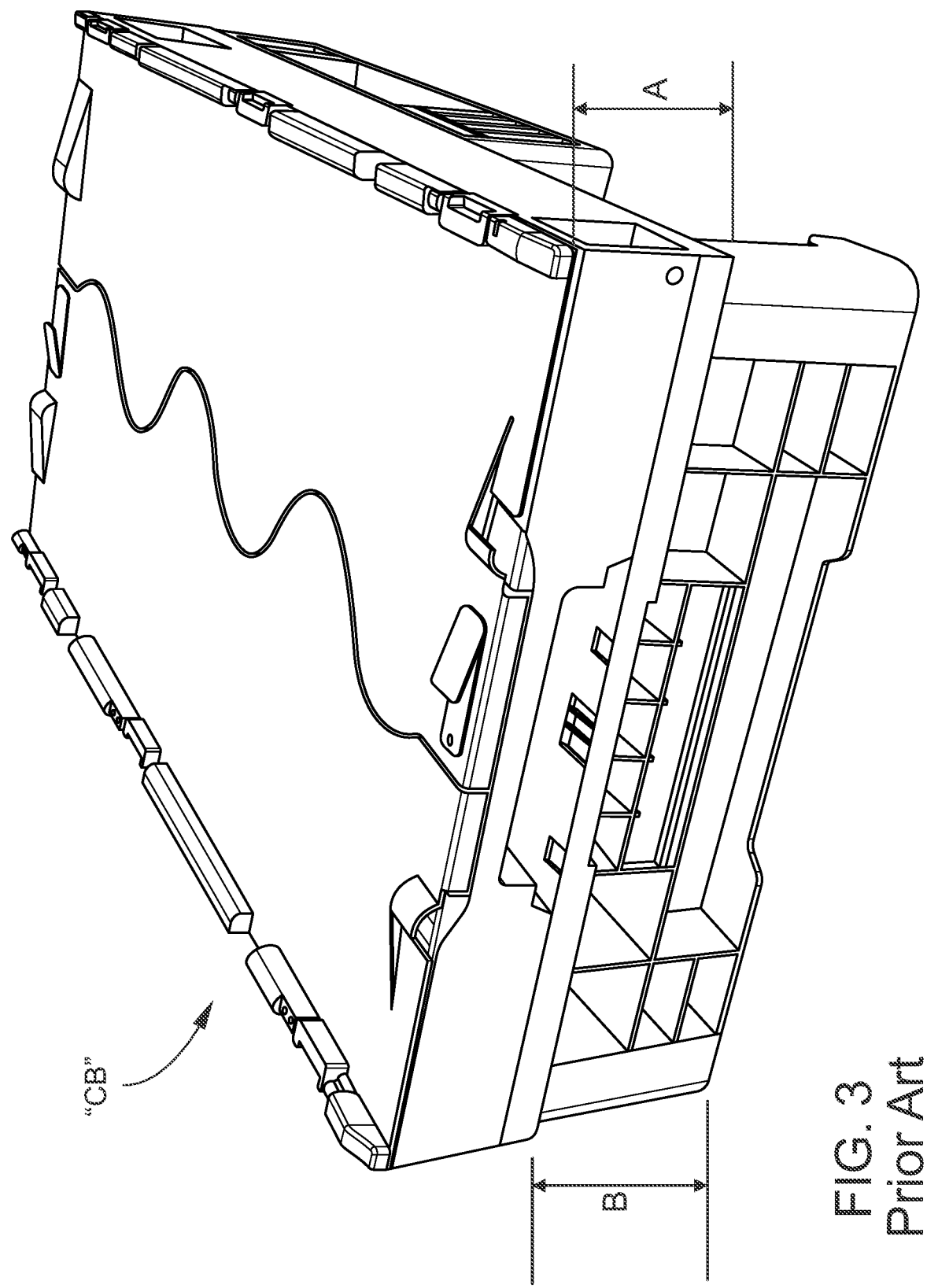
Figure 4:
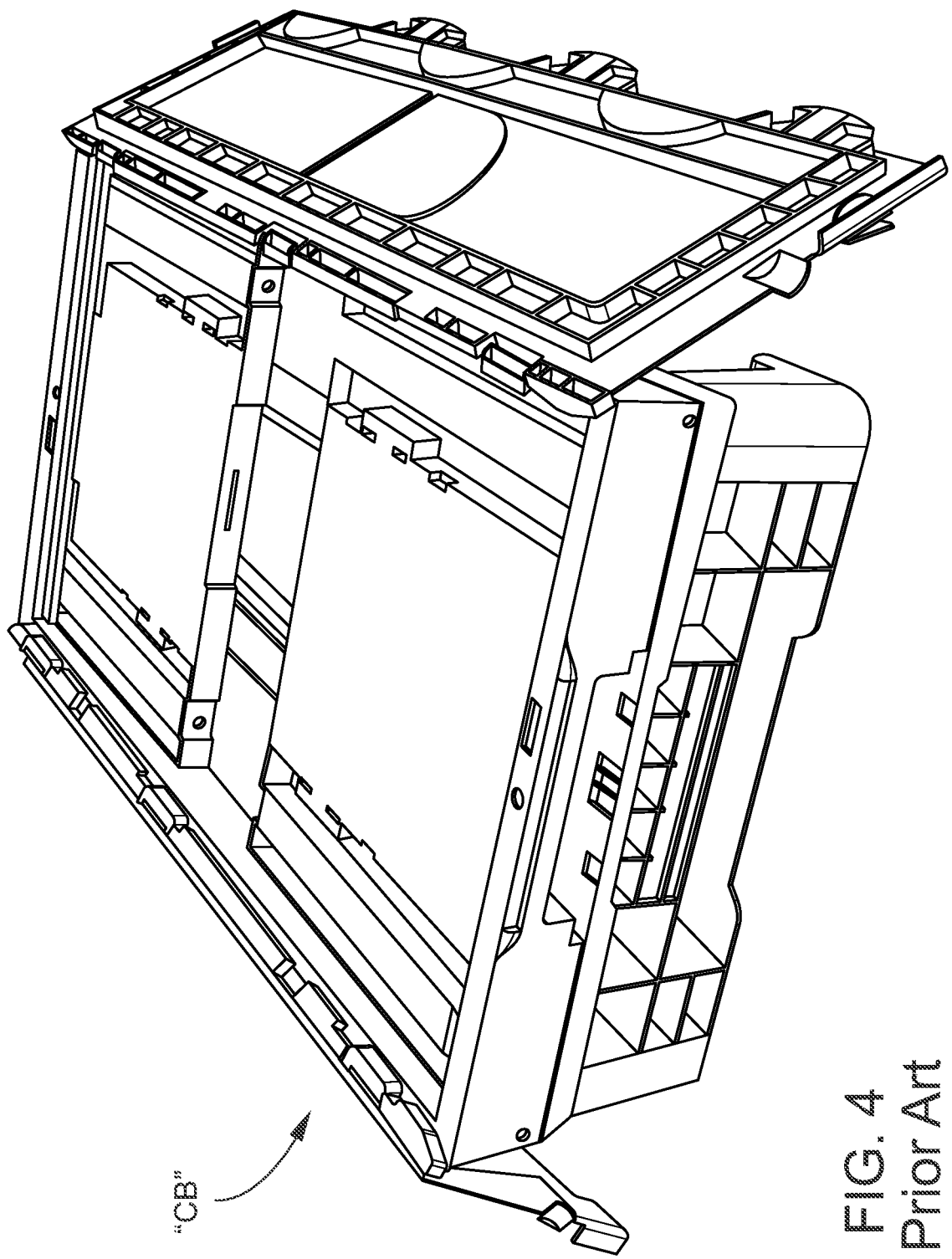
Figure 5:
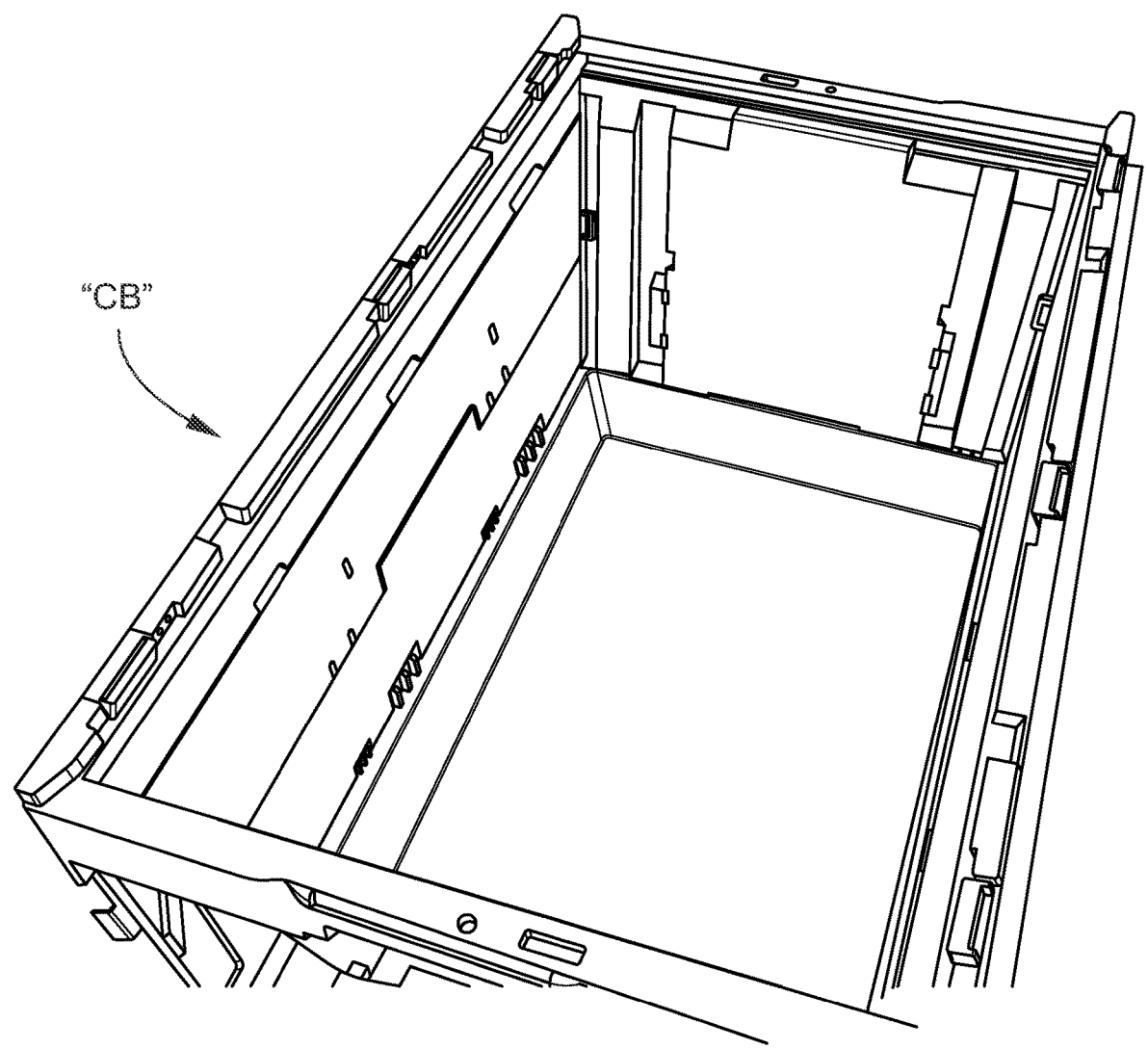
Figure 6:
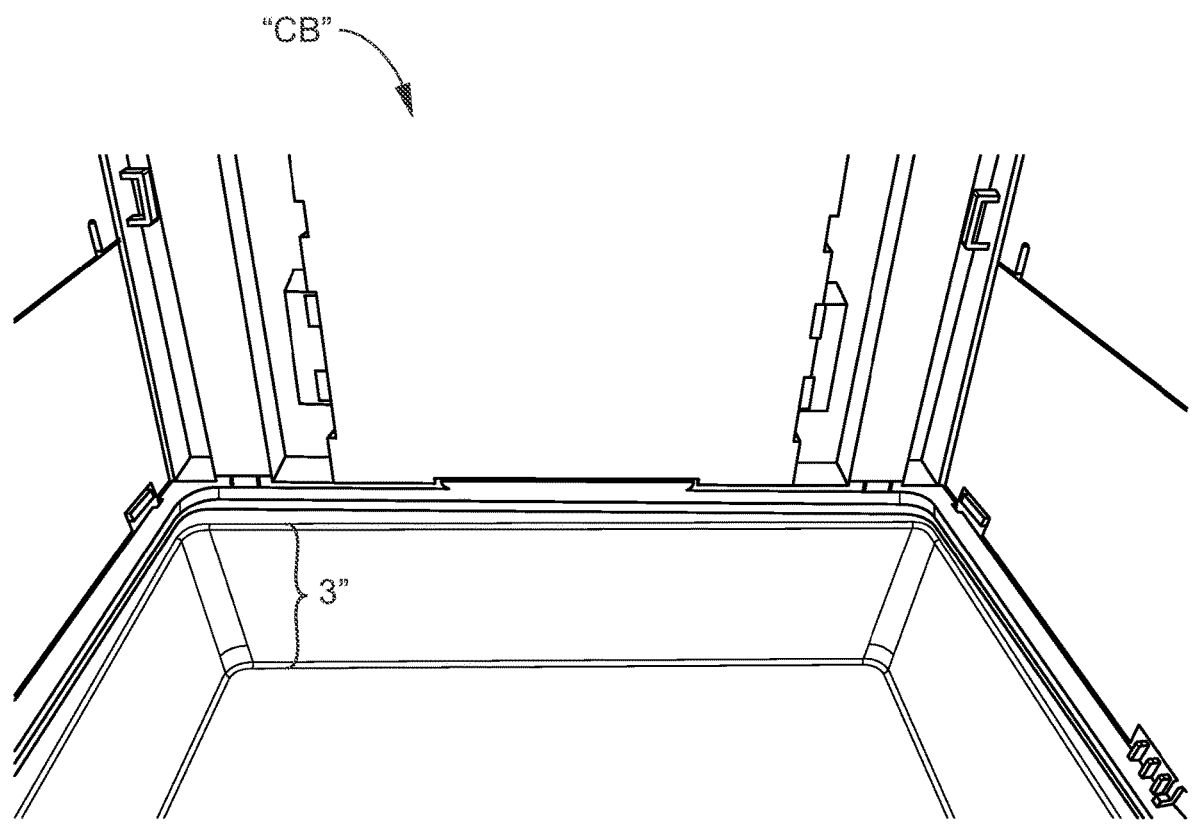

Referring now specifically to the drawings, a collapsible box "CB" according to a prior art collapsible box is shown in FIGS. 1-6. The collapsible box "CB" of FIG. 1 is shown in a fully erect, use position. The collapsing walls are attached at the bottom. The height "B" shows the open usable volume that the dunnage bottom provides. FIG. 2 shows an endwall being folded into the volume of the collapsible box CB" as part of the collapse process. FIG. 3 shows the box "CB" fully collapsed, with the height "A" representing the volume that is filled with the folded and pivoting sidewalls, with no empty volume. In FIG. 4 the collapsed box "CB" is opened by first folding away the interlocking covers. The lower volume is shown remaining empty when the sidewalls are folded down. According to FIGS. 5 and 6, removable dunnage pockets can be removed from the erect box "CB", folded up and placed in the bottom of the collapsed box "CB", keeping the dunnage pockets with the collapsed box "CB".

Figure 7:
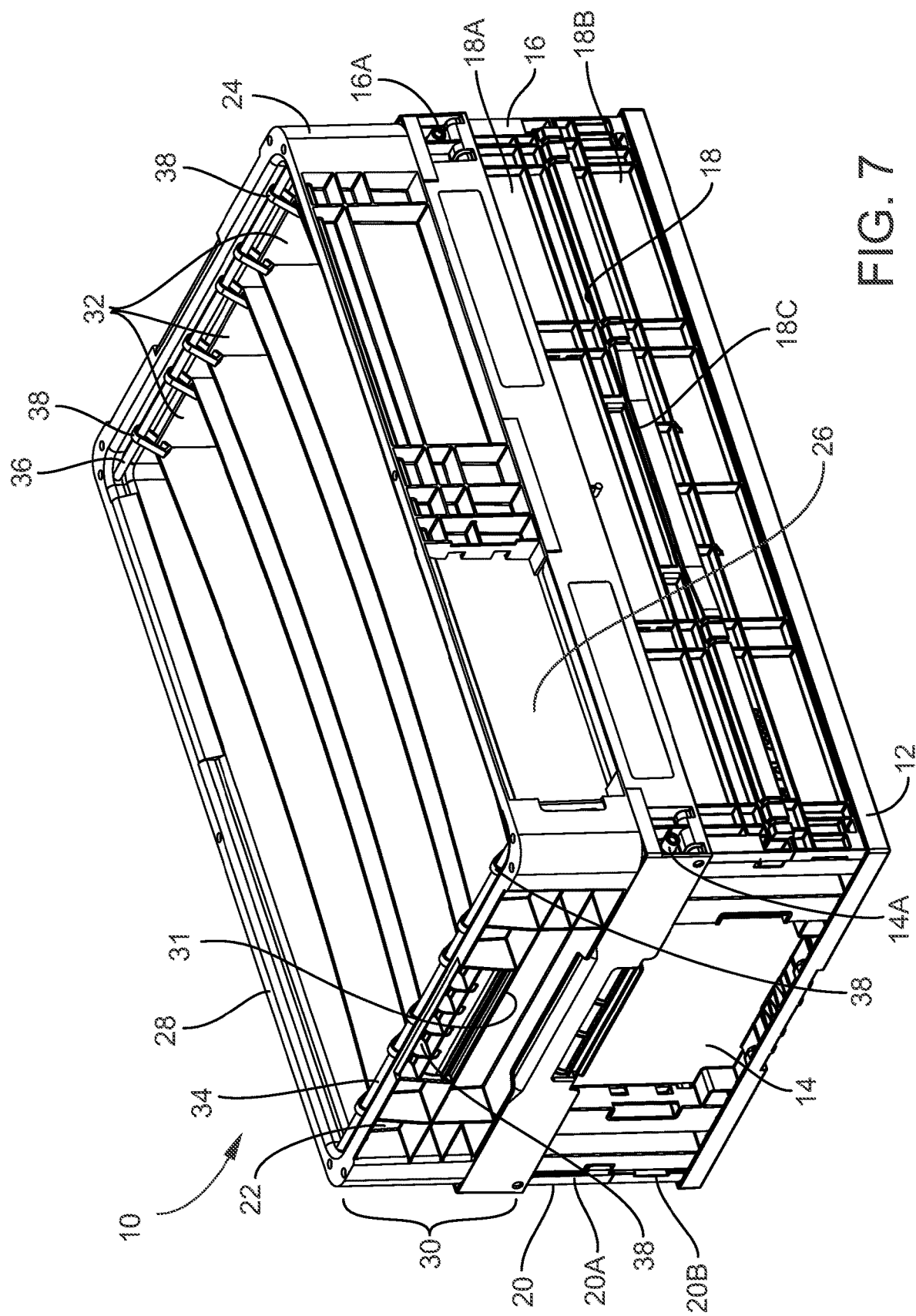
FIGS. 7-9 are perspective views of a collapsible box according to an embodiment of the invention that places the "storage volume" of the collapsed box at the top of the box instead of at the bottom.
Figure 8:
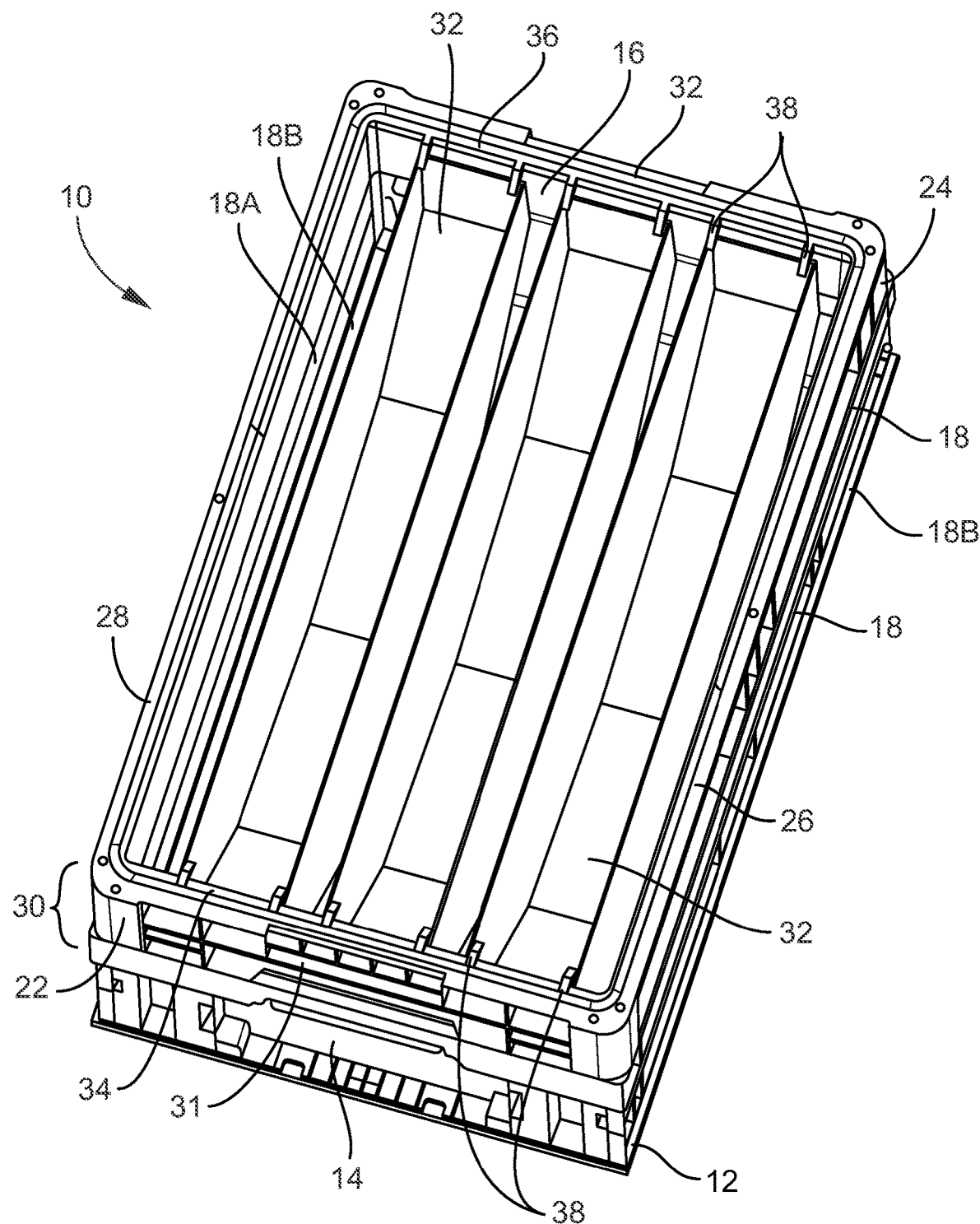
Figure 9:
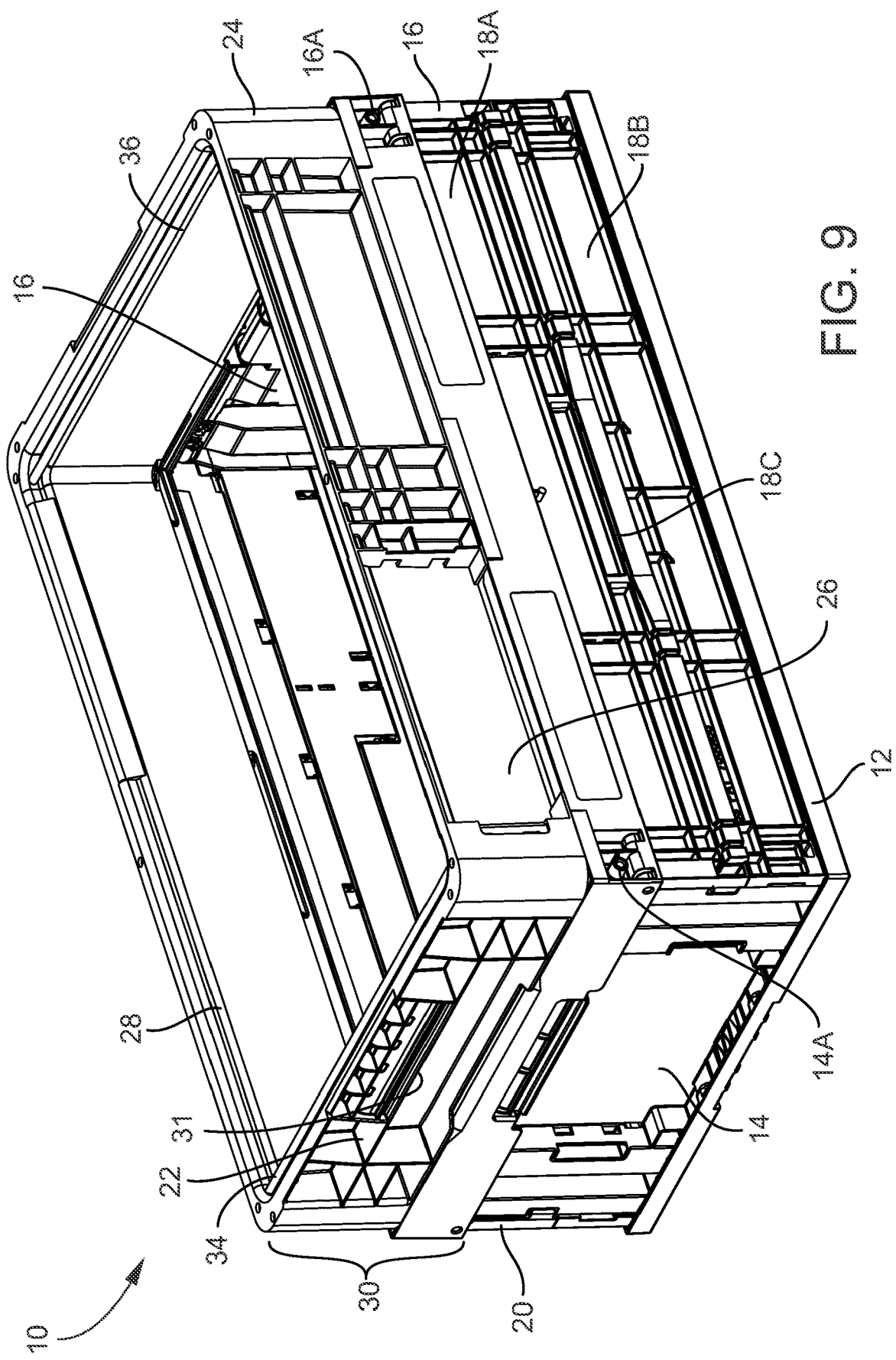

A collapsible dunnage box 10 according to an embodiment of the invention is shown in FIGS. 7-20. As best shown in FIGS. 7-9, the box 10 includes a base 12 to which are mounted opposed first and second base endwalls 14, 16 and first and second base sidewalls 18, 20. The base endwalls 14, 16 are mounted for pivoting movement on base endwall hinges 14A, 16A. The base sidewalls 18, 20 are formed by two base sidewall panels 18A, 18B and 20A, 20B, respectively that are joined along an adjoining common hinge line by respective base sidewall hinges 18C, 20C.

Top endwalls 22, 24 are mounted to the top edge of the base endwalls 14, 16, respectively, and top sidewalls 26, 28 are pivotally mounted to the top edge of the base sidewall panels 18A, 20A, respectively. The top endwalls 22, 24 and top sidewalls 26, 28 collectively define a collar 30. The collar 30 includes a pair of opposed lifting recesses 31. Dunnage pockets 32 are positioned in the box 10 and are suspended from dunnage hangers 34, 36 by hooks 38 attached to the top of the dunnage pockets 32, as best shown in FIGS. 7 and 8. The dunnage pockets 32 are preferably constructed of a crushable, reusable web material, for example, cloth, plastic, film or similar material, capable of being crushed and compressed into a randomly-defined shape and then decompressed into their original shape for reuse by being suspended from the dunnage hangers 34, 36 by the hooks 38.

In contrast to the collapsible box "CB" of FIGS. 1-6, the storage volume for the dunnage pockets 32 is formed in the top of the box 10 in the collar 30. In effect, the storage volume is defined by the collar 30 that extends around the top of the box 10 as shown even when the box 10 is completely collapsed. This is particularly useful with dunnage of the type that is formed of hanging dunnage elements, for example, the dunnage pockets 32 that hold parts vertically within their folds. These dunnage pockets 32 can be folded and crushed into the required volume of the collar 30 of the collapsed box 10.

Figure 10:
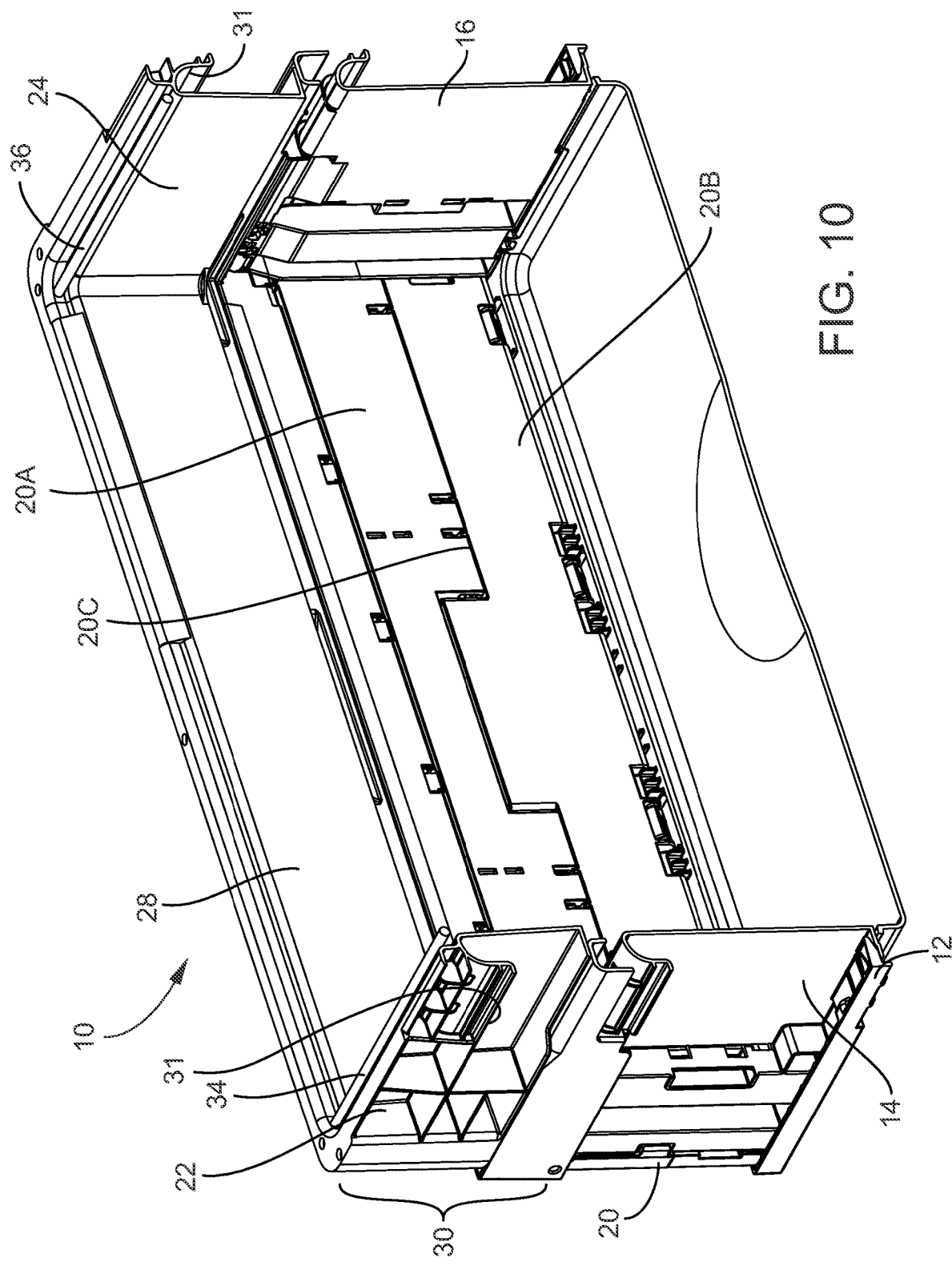
FIGS. 10-14 are cross-sectional views of a box according to FIGS. 7-9 in progressive states of collapse.
Figure 11:
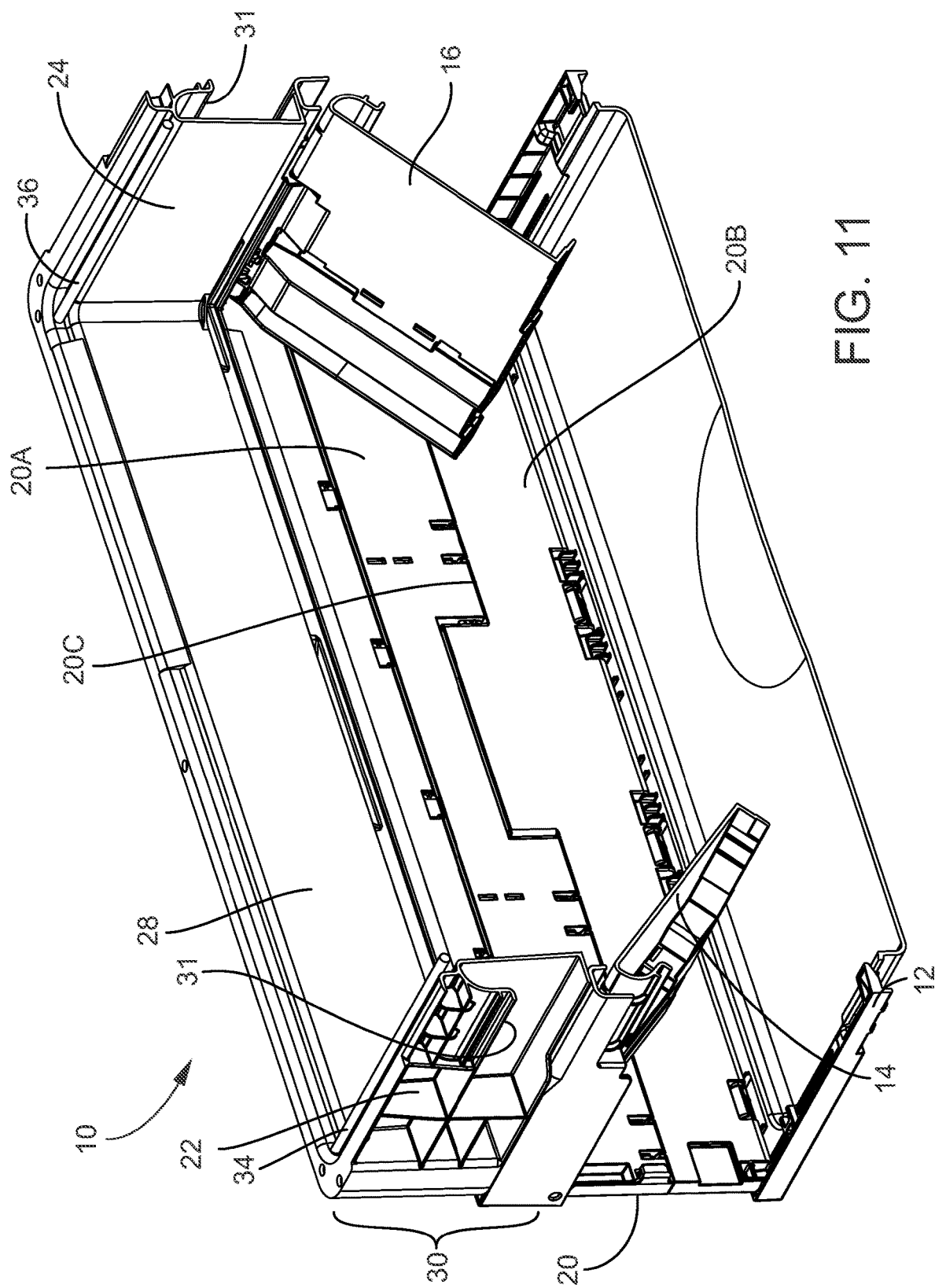
Figure 12:
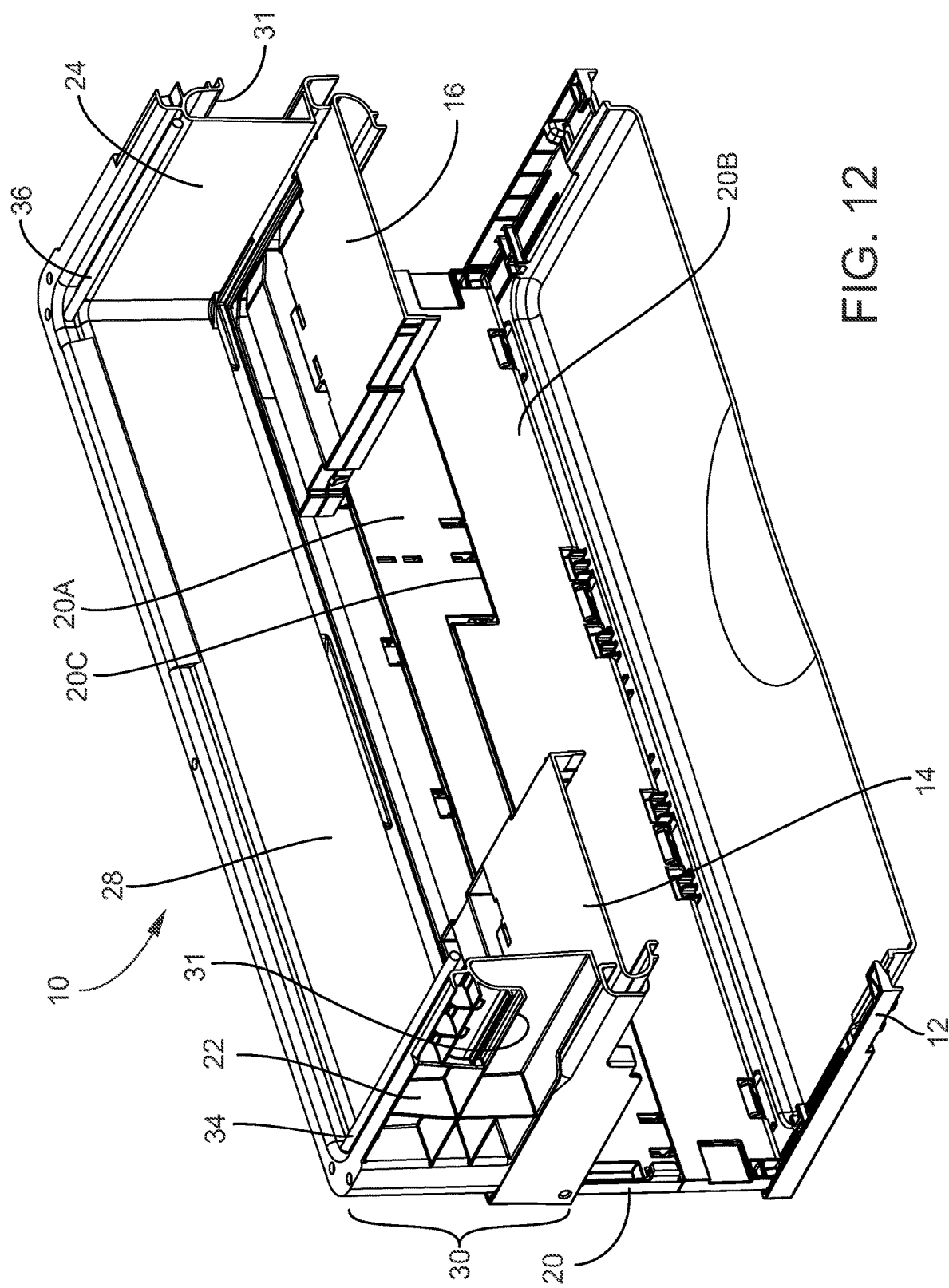

Referring now to FIGS. 10-14, the box 10 has been vertically cross-sectioned to more clearly reveal the interior of the box 10 and the interrelationship between the action of the base endwalls 14, 16 and the base sidewalls 18, 20. FIG. 10 shows the base endwalls 14, 16 and the base sidewalls 18, 20 flat and fully erect, in the deployed "use" position capable of storing and shipping parts in the dunnage pockets 32, not shown. FIG. 11 shows the beginning of the box 10 collapsing process, with the base endwalls 14, 16 being pushed inwardly and upwardly into the volume of the box 10 and towards each other into a stowed position. In FIG. 12, the base endwalls 14, 16 are fully pushed inwardly and up into the stowed position perpendicular to their use position, while the base sidewalls 18, 20 remain vertical and fully erect, as in FIGS. 10 and 11.

Figure 13:
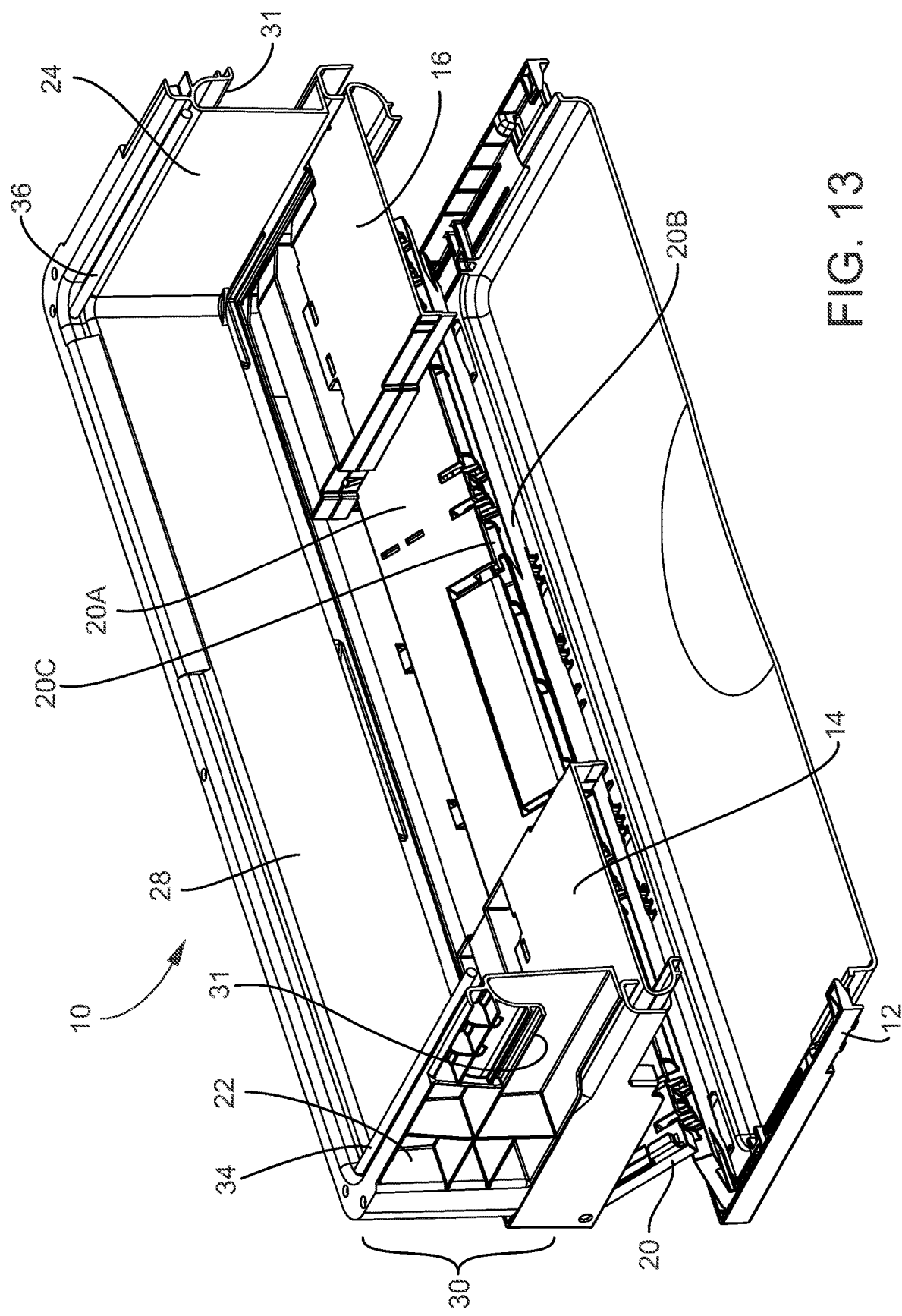
Figure 14:
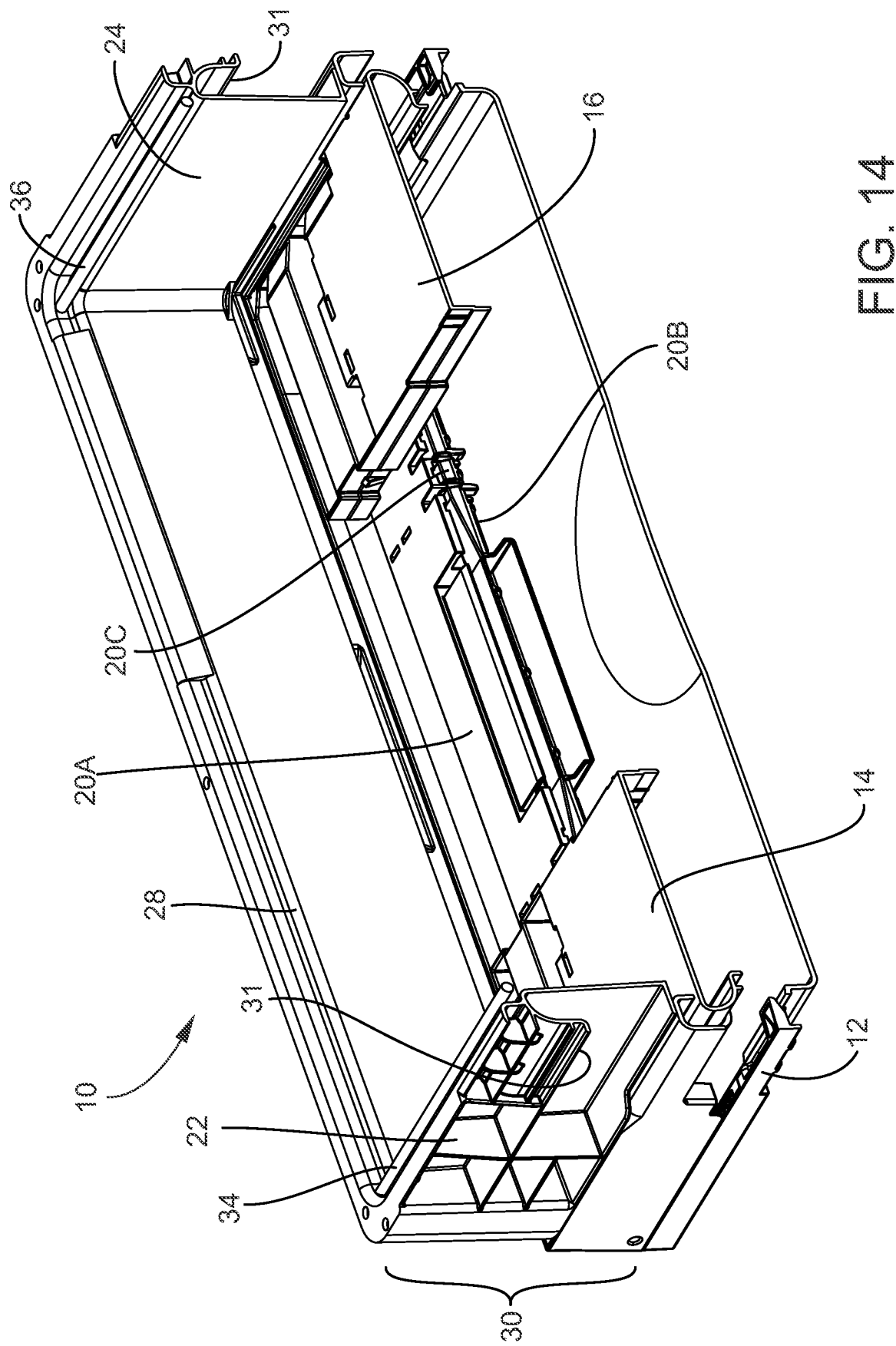
Figure 15:
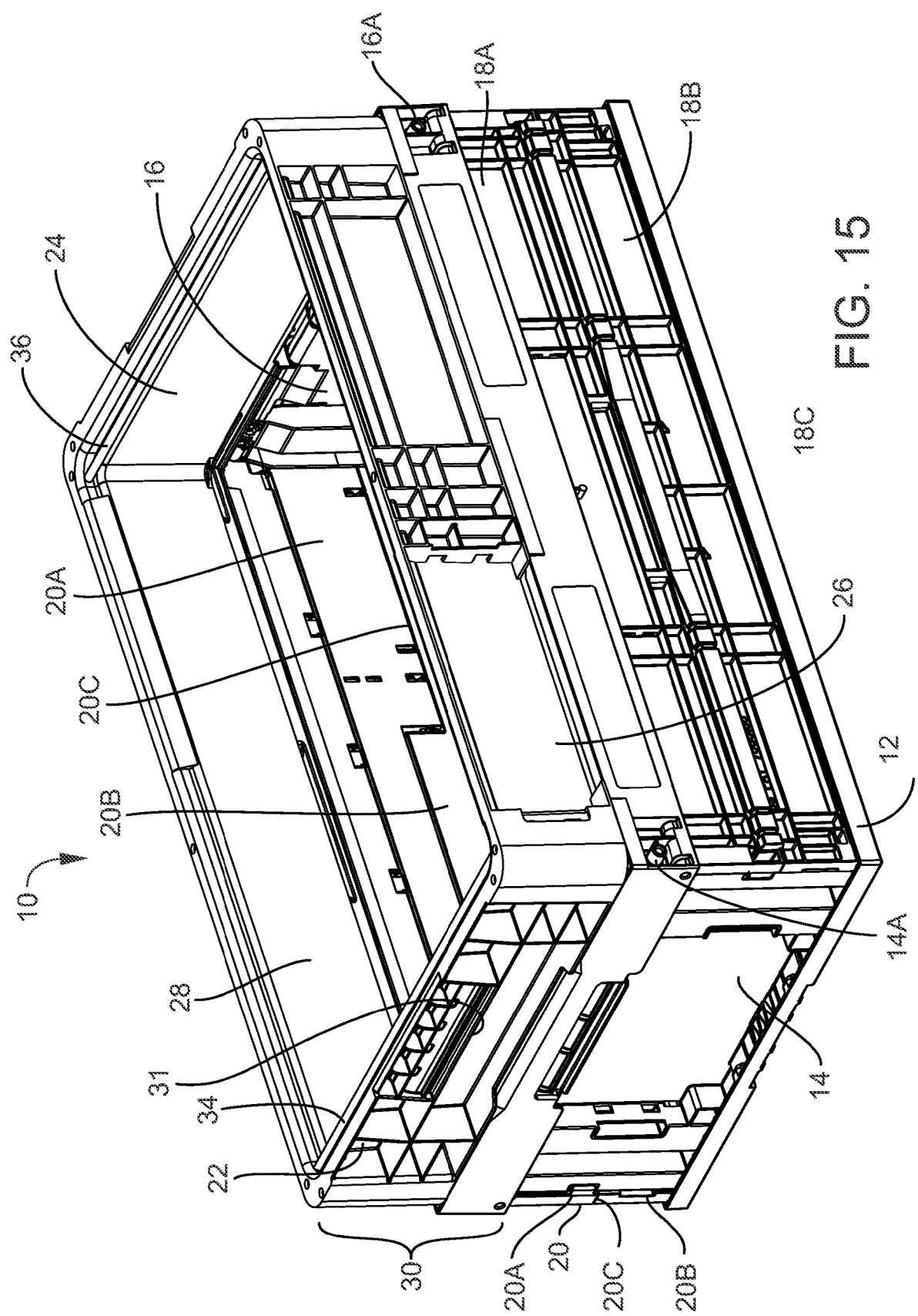
FIG. 15 is a perspective view of the box without dunnage.

In FIG. 13, the base endwalls 14, 16 are fully pushed up into the stowed position, with the base sidewalls 18, 20 beginning to hinge inwardly into the volume of the box 10 along their common hinges 18C, 20C. In FIG. 14 the box 10 is fully collapsed into a stowed position, with the base endwalls 14, 16 now forming the base of a dunnage pocket 32 storage volume. Note that the fully hinged, stowed base sidewalls 18, 20 reside in the box 10 directly beneath the stowed base endwalls 14, 16. The collar 30 has now descended onto the top of the base 12 and defines a volume sufficient for the dunnage pockets 32 to be folded and positioned in that volume for storage and shipment back to, for example, a parts supplier where the box 10 will be re-erected by reversing the process shown and described in FIGS. 10-14. FIG. 15 shows a fully erected box without dunnage pockets for clarity.

Figure 16:
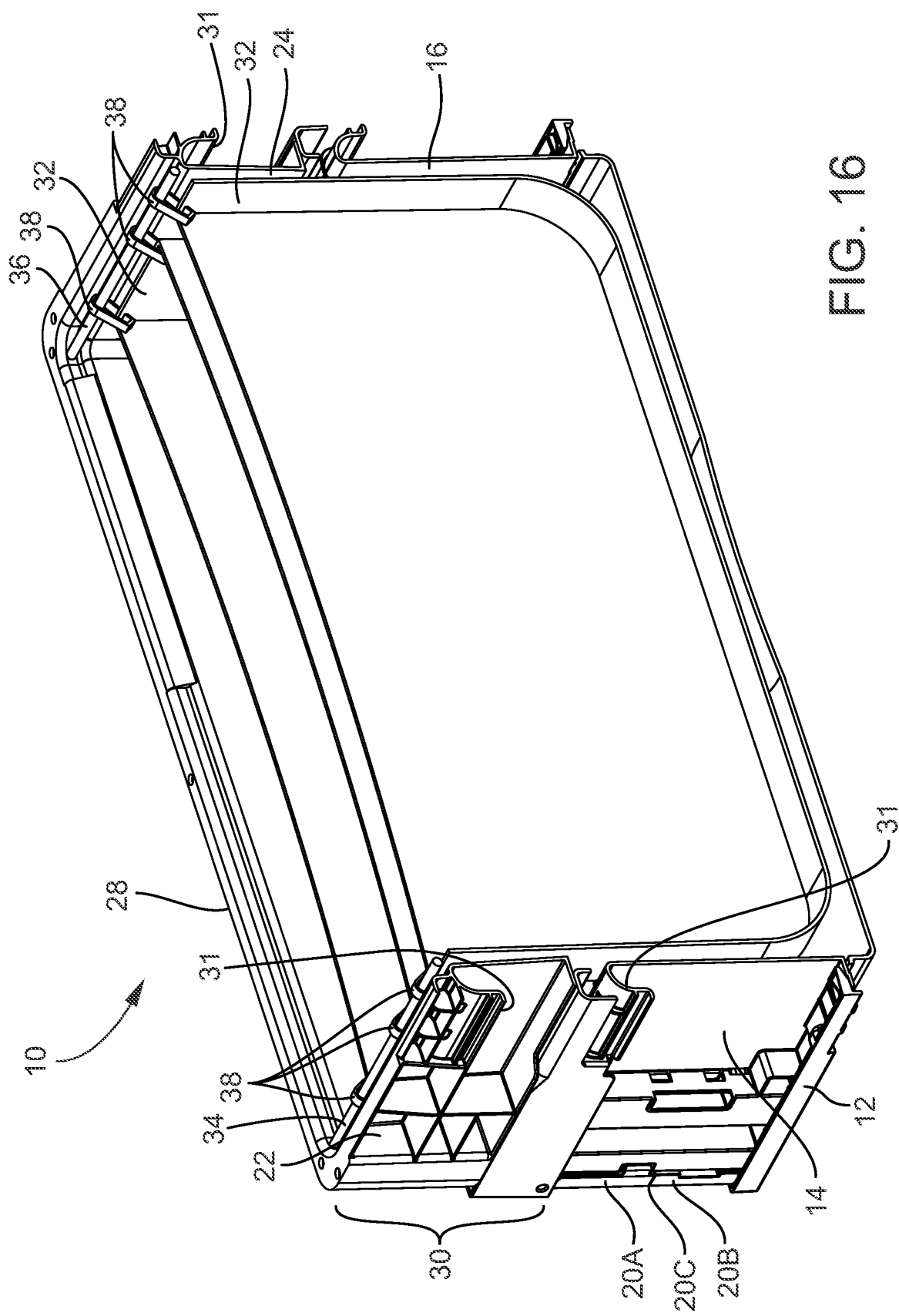
FIGS. 16-19 are cross-sectional views of a box as in FIGS. 7-15, and including dunnage that collapses along with the box.
Figure 17:
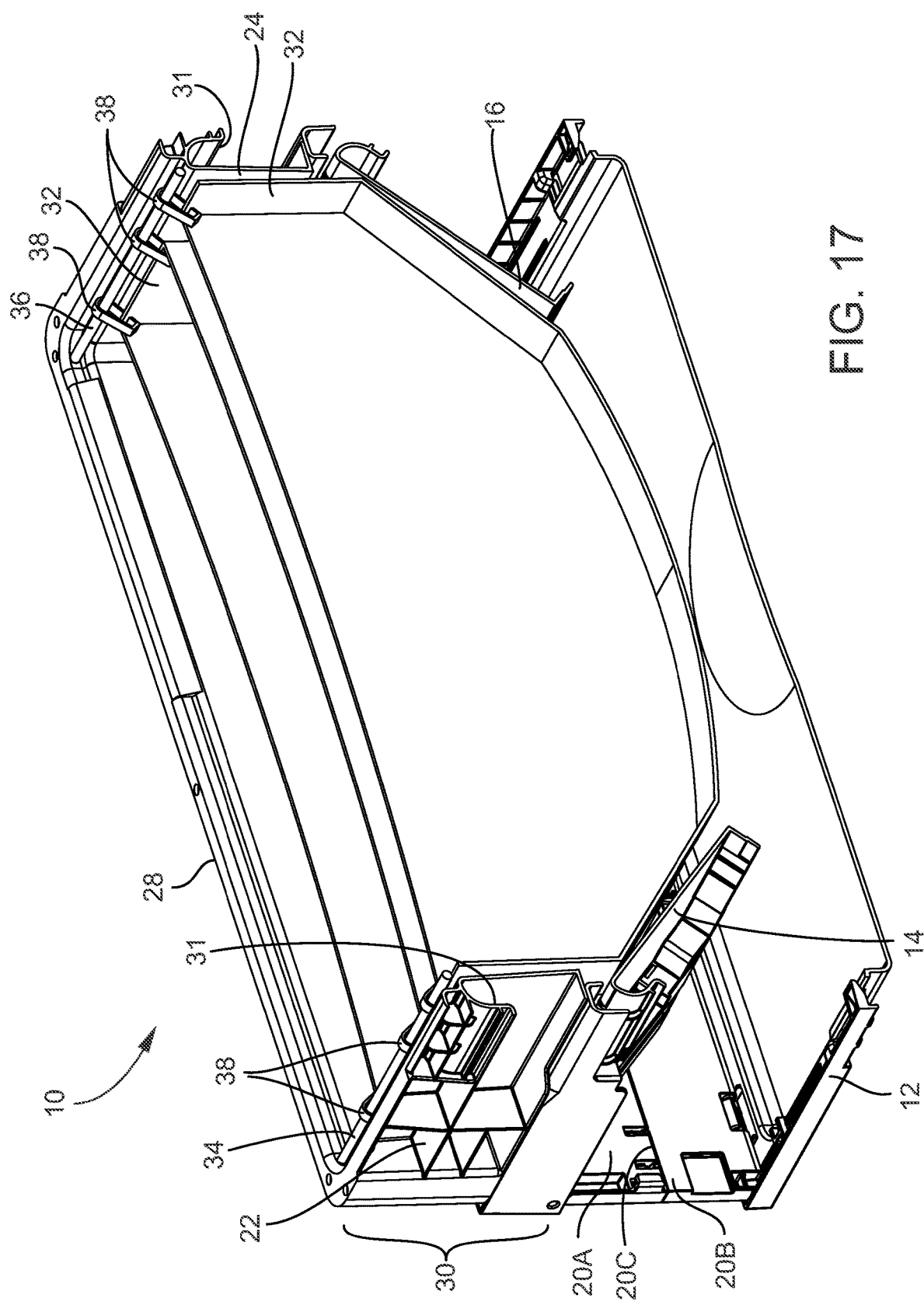
Figure 18:
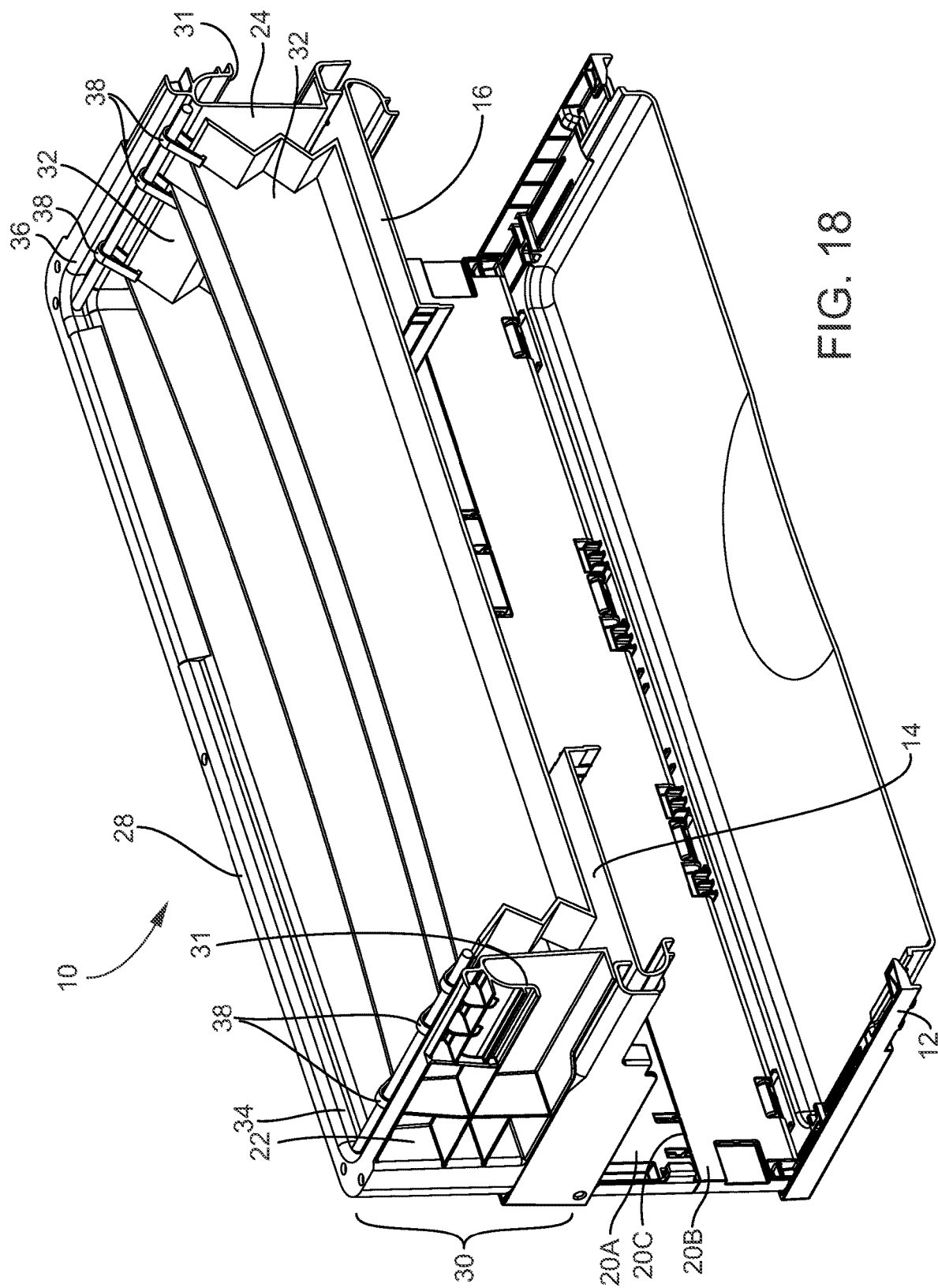
Figure 19:
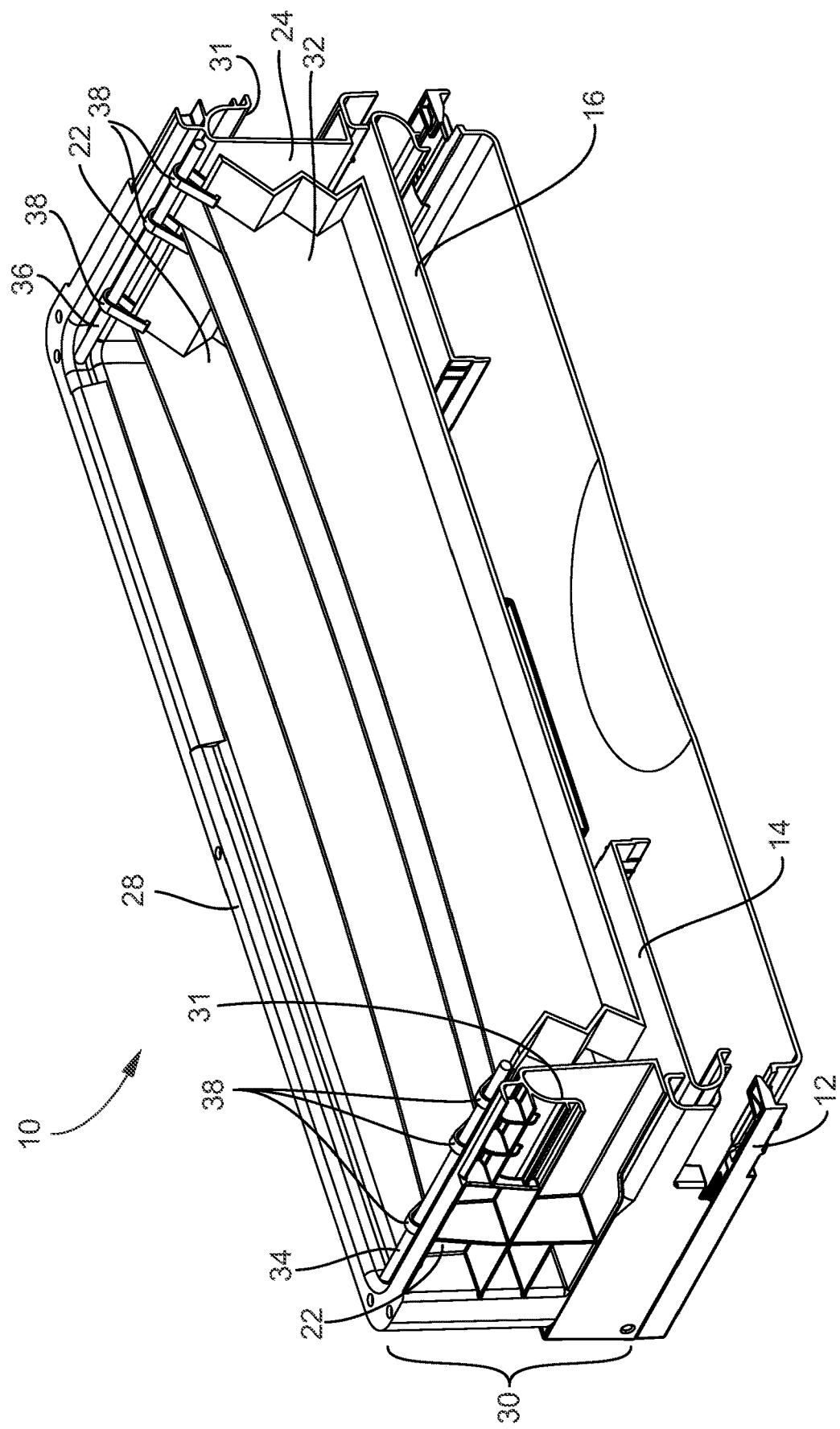

Referring to FIGS. 16-19, the box 10 is shown with the foldable fabric dunnage pockets positioned in the box 10. FIG. 16 shows a fully erect dunnage box 10 with the foldable fabric dunnage pockets 32 suspended from near the top of the box 10, and hanging down into the volume of the box 10. In FIG. 17 the endwalls 14, 16 have begun to fold inward to form the floor of the collar 30 with the dunnage sleeves 32 starting to be pushed upward. In the cross-sectional views of FIGS. 18-19, the box 10 is progressively being collapsed into a flattened position in the manner corresponding to FIGS. 12-14. In FIG. 18 the endwalls 14, 16 are fully raised into the collapsed position and the sidewalls 18, 20 remain erect in their deployed position. In FIG. 19 the endwalls 14, 16 are fully raised into the collapsed position and the sidewalls 18, 20 have begun to fold inward. In FIG. 19, the endwalls and the sidewalls of the box 10 are fully collapsed. The dunnage pockets 32 are fully pushed upwardly into the top area of the box 10 defined by the collar 30.

A collapsible dunnage box according to the invention has been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A collapsible dunnage box, comprising:
   (a) a box base,
   (b) first and second opposed base sidewalls attached to the box base on opposing sides of the box, each of the first and second base sidewalls comprising;
      (i) a lower base sidewall panel attached by a base hinge to the box base; and
      (ii) an upper base sidewall panel attached to a top edge of respective ones of the lower base sidewall panels along adjacent edges by lower sidewall hinges, the upper and lower base sidewall panels mounted pivotally-moveable relative to each other and the base between an erect vertical deployed position and an inwardly collapsed horizontal stowed position;
   (c) first and second opposed top sidewalls pivotally attached to the top edge of respective ones of the upper base sidewall panels by upper sidewall hinges;
   (d) first and second opposed top endwalls perpendicular to and connecting the first and second top sidewalls to form a box enclosure;
   (e) the top endwalls and the top sidewalls collectively defining a collar extending around a periphery of the box to form a topmost collar opening;
   (f) first and second opposed base endwalls pivotally-mounted to the top endwalls of the collar perpendicular to the first and second sidewalls and moveable between a lowered, vertical deployed position enclosing respective ends of the box and a raised, horizontal stowed position; and
   (g) the upper and lower base sidewall panels in the inwardly collapsed horizontal stowed position and the first and second opposed base endwalls in the raised, horizontal stowed position collectively forming a bottom of the collar, the topmost collar opening adapted for receiving the dunnage of the box for storage and shipment in the collar and supported by the bottom of the collar while the dunnage box is in its collapsed position.

2. A collapsible dunnage box according to claim 1, wherein the dunnage box is adapted to be collapsed from its deployed position to its stowed position by first pivoting the first and second opposing base endwalls upwardly and inwardly from the vertical deployed position into the horizontal stowed position, and further adapted to thereafter pivot the first and second opposing base sidewalls inwardly towards each other to allow the collar to descend towards the box base.

3. A collapsible dunnage box according to claim 1, wherein the dunnage box is adapted to be collapsed from its deployed position to its stowed position by pivoting the first and second opposing base endwalls upwardly and inwardly from the vertical deployed position into the horizontal stowed position, and further adapted to pivot the first and second opposing base sidewalls inwardly towards each other to allow the collar to descend towards the box base.

4. A collapsible dunnage box according to claim 1, wherein the top endwalls include dunnage hangers for suspending a plurality of dunnage pockets within the box.

5. A collapsible dunnage box according to claim 1, in combination with a plurality of dunnage pockets formed of a crushable, reusable web material adapted for being compressed into a size and shape suitable for being contained within the collar of the dunnage box when in its stowed position.

6. A collapsible dunnage box according to claim 1, wherein the base includes a flat box bottom defining the perimeter of the box and a raised rim extending around the perimeter of the box bottom.

7. A collapsible dunnage box according to claim 1, wherein the top endwalls include recessed hand holds for lifting the box.

8. A collapsible dunnage box, comprising:
(a) a box base;
(b) first and second opposed base sidewalls attached to the box base on opposing sides of the box, each of the first and second base sidewalls comprising;
  (i) a lower base sidewall panel attached by a lower base hinge to the box base; and
  (ii) an upper base sidewall panel attached to a top edge of respective ones of the lower base sidewall panels along adjacent edges by upper sidewall hinges, whereby the upper and lower base sidewall panels are pivotally moveable relative to each other and the base between an erect vertical deployed position and an inwardly collapsed horizontal stowed position;
(c) first and second opposed top sidewalls pivotally attached to the top edge of respective ones of the upper base sidewall panels by top sidewall hinges;
(d) first and second opposed top endwalls perpendicular to and connecting the first and second top sidewalls to form a box enclosure and a topmost collar opening;
(e) first and second opposed base endwalls pivotally-mounted to the top endwalls and moveable between a lowered, vertical deployed position enclosing respective ends of the box and a raised, horizontal stowed position, and
(f) the upper and lower base sidewall panels in the inwardly collapsed horizontal stowed position and the first and second opposed base endwalls in the raised, horizontal stowed position collectively forming a bottom, the topmost collar opening adapted for receiving dunnage of the box for storage and shipment in the collar above and supported by the bottom while the dunnage box is in its collapsed position.

9. A collapsible dunnage box according to claim 8, wherein the dunnage box is collapsed from its deployed position to its stowed position by first pivoting the first and second opposing base endwalls upwardly and inwardly from the vertical deployed position into the horizontal stowed position and thereafter pivoting the first and second opposing base sidewalls inwardly towards each other.

10. A collapsible dunnage box according to claim 8, wherein the dunnage box is adapted to be collapsed from its deployed position to its stowed position by pivoting the first and second opposing base endwalls upwardly and inwardly from the vertical deployed position into the horizontal stowed position and further adapted to pivot the first and second opposing base sidewalls inwardly towards each other.

11. A collapsible dunnage box according to claim 8, wherein the top endwalls include dunnage hangers adapted for suspending a plurality of dunnage pockets within the box.

12. A collapsible dunnage box according to claim 8, in combination with a plurality of dunnage pockets formed of a crushable, reusable web material adapted for being compressed into a size and shape suitable for being contained within the dunnage box when in its stowed position.

13. A collapsible dunnage box according to claim 8, wherein the base includes a flat box bottom defining the perimeter of the box and a raised rim extending around the perimeter of the box bottom.

14. A collapsible dunnage box according to claim 8, wherein the top endwalls include recessed hand holds for lifting the box.

15. A method of storing dunnage within a dunnage box, comprising the steps of:
(a) providing a collapsible dunnage box, comprising:
  (i) a box base,
  (ii) first and second opposed base sidewalls attached to the box base on opposing sides of the box, each of the first and second base sidewalls comprising a lower base sidewall panel attached by a base hinge to the box base and an upper base sidewall panel attached to a top edge of respective ones of the lower base sidewall panels along adjacent edges by lower sidewall hinges;
  (iii) first and second opposed top sidewalls pivotally attached to the top edge of respective ones of the upper base sidewall panels by upper sidewall hinges;
  (iv) first and second opposed top endwalls perpendicular to and connecting the first and second top sidewalls to form a box enclosure; and
  (v) first and second opposed base endwalls pivotally-mounted to the top endwalls; and moveable between a lowered, vertical deployed position enclosing respective ends of the box and a raised, horizontal stowed position, the stowed position adapted to contain and store dunnage positioned in an uppermost portion of the box;
(b) moving the upper and lower base sidewall panels relative to each other and the base between an erect vertical deployed position and an inwardly collapsed horizontal stowed position; and
(c) moving the first and second opposed base endwalls between a lowered, vertical deployed position enclosing respective ends of the box and a raised, horizontal stowed position, the stowed position defining an uppermost void adapted to contain and store dunnage of the box positioned in an upper portion of the box.

16. A method according to claim 15, and including the steps of providing a plurality of dunnage pockets formed of a crushable, reusable web material positioned in the dunnage box, and compressing the dunnage into a size and shape suitable for being contained within the dunnage box when in its stowed position as the upper and lower base sidewall panels and the first and second opposed base endwalls are moved from the deployed position to the stowed position.

17. A method according to claim 15, wherein the step of moving the upper and lower base sidewall panels relative to each other and the base between an erect vertical deployed position and an inwardly collapsed horizontal stowed position is carried out first and thereafter the step of moving the first and second opposed base endwalls between a lowered, vertical deployed position enclosing respective ends of the box and a raised, horizontal stowed position is carried out.

\* \* \* \* \*